US010372368B2

(12) United States Patent
Galbraith et al.

(10) Patent No.: US 10,372,368 B2
(45) Date of Patent: Aug. 6, 2019

(54) OPERATING A RAID ARRAY WITH UNEQUAL STRIPES

(71) Applicant: International Business Machines Corporation, Armonk, NY (US)

(72) Inventors: Robert Galbraith, Rochester, MN (US); Adrian C. Gerhard, Rochester, MN (US); Daniel F. Moertl, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 15/292,202

(22) Filed: Oct. 13, 2016

(65) Prior Publication Data

US 2018/0107383 A1   Apr. 19, 2018

(51) Int. Cl.
*G06F 3/06*      (2006.01)
*G06F 11/10*     (2006.01)

(52) U.S. Cl.
CPC .......... *G06F 3/0644* (2013.01); *G06F 3/061* (2013.01); *G06F 3/064* (2013.01); *G06F 3/0629* (2013.01); *G06F 3/0659* (2013.01); *G06F 11/1076* (2013.01)

(58) Field of Classification Search
CPC ........ G06F 3/0644; G06F 3/064; G06F 3/061; G06F 3/0659; G06F 11/1076; G06F 3/0629
See application file for complete search history.

(56) References Cited

U.S. PATENT DOCUMENTS

| 6,038,570 | A | * | 3/2000 | Hitz ................. G06F 3/0601 |
| 6,065,096 | A | * | 5/2000 | Day .................. G06F 3/0626 711/112 |
| 6,112,226 | A | * | 8/2000 | Weaver ............. G11B 27/031 348/E5.008 |
| 6,138,126 | A | * | 10/2000 | Hitz ................. G06F 3/0613 |
| 6,279,138 | B1 | | 8/2001 | Jadav et al. |
| 6,311,251 | B1 | | 10/2001 | Merritt et al. |
| 6,591,339 | B1 | | 7/2003 | Horst et al. |
| 6,748,488 | B2 | | 6/2004 | Byrd et al. |
| 6,938,123 | B2 | | 8/2005 | Willis et al. |
| 8,484,408 | B2 | * | 7/2013 | Hetzler ............. G06F 12/0868 711/103 |
| 8,572,311 | B1 | * | 10/2013 | Shalvi ............... G06F 11/14 711/103 |
| 8,615,681 | B2 | | 12/2013 | Horn |
| 8,775,868 | B2 | | 7/2014 | Colgrove et al. |
| 9,348,696 | B2 | | 5/2016 | Colgrove et al. |

(Continued)

*Primary Examiner* — Joseph D Torres
(74) *Attorney, Agent, or Firm* — Peter J. Edwards

(57) ABSTRACT

Operating a RAID array with unequal stripes, the RAID array comprising N number of drives, where each RAID stripe includes P number of parity drives and N-P number of data drives, including buffering, by a RAID controller, write operations received from a host, each write operation specifying data to be written to the RAID array; distributing, by the RAID controller, the data to be written amongst N-P write groups, including: dividing the data into chunks of a sub-stripe size, wherein the sub-stripe size is less than a parity stripe size; and assigning the chunks, in round-robin order, to the N-P write groups; calculating parity from the N-P write groups; and writing the N-P write groups and the calculated parity as a first RAID stripe to the RAID array.

20 Claims, 9 Drawing Sheets

(56) References Cited

U.S. PATENT DOCUMENTS

| | | | | |
|---|---|---|---|---|
| 2002/0091903 A1* | 7/2002 | Mizuno | ................. | G06F 3/0605 |
| | | | | 711/154 |
| 2007/0143541 A1* | 6/2007 | Nichols | ............... | G06F 11/1084 |
| | | | | 711/114 |
| 2009/0204846 A1* | 8/2009 | Baloun | ............... | G06F 11/1076 |
| | | | | 714/6.12 |
| 2009/0276567 A1* | 11/2009 | Burkey | ............... | G06F 11/2061 |
| | | | | 711/114 |
| 2009/0287956 A1* | 11/2009 | Flynn | ................. | G06F 11/1008 |
| | | | | 714/6.12 |
| 2013/0297854 A1* | 11/2013 | Gupta | ................. | G06F 11/1441 |
| | | | | 711/103 |
| 2014/0208024 A1* | 7/2014 | Simionescu | ............ | G06F 3/061 |
| | | | | 711/114 |

* cited by examiner

OPERATING A RAID ARRAY WITH UNEQUAL STRIPES

BACKGROUND

Field of the Invention

The field of the invention is data processing, or, more specifically, methods, apparatus, and products for operating a redundant array of independent disks (RAID) array with unequal stripes.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Methods, systems, and apparatus for operating a redundant array of independent disks (RAID) array with unequal stripes are disclosed in this specification. Operating a RAID array with unequal stripes, includes buffering, by a RAID controller, write operations received from a host, each write operation specifying data to be written to the RAID array, wherein the RAID array comprises N number of drives, where each RAID stripe includes P number of parity drives and N-P number of data drives; distributing, by the RAID controller, the data to be written amongst N-P write groups, including: dividing the data into chunks of a sub-stripe size, wherein the sub-stripe size is less than a parity stripe size; and assigning the chunks, in round-robin order, to the N-P write groups; calculating parity from the N-P write groups; and writing the N-P write groups and the calculated parity as a first RAID stripe to the RAID array, including: writing each of the N-P write groups to a data stripe of the first RAID stripe; and writing the calculated parity to a parity stripe of the first RAID stripe.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
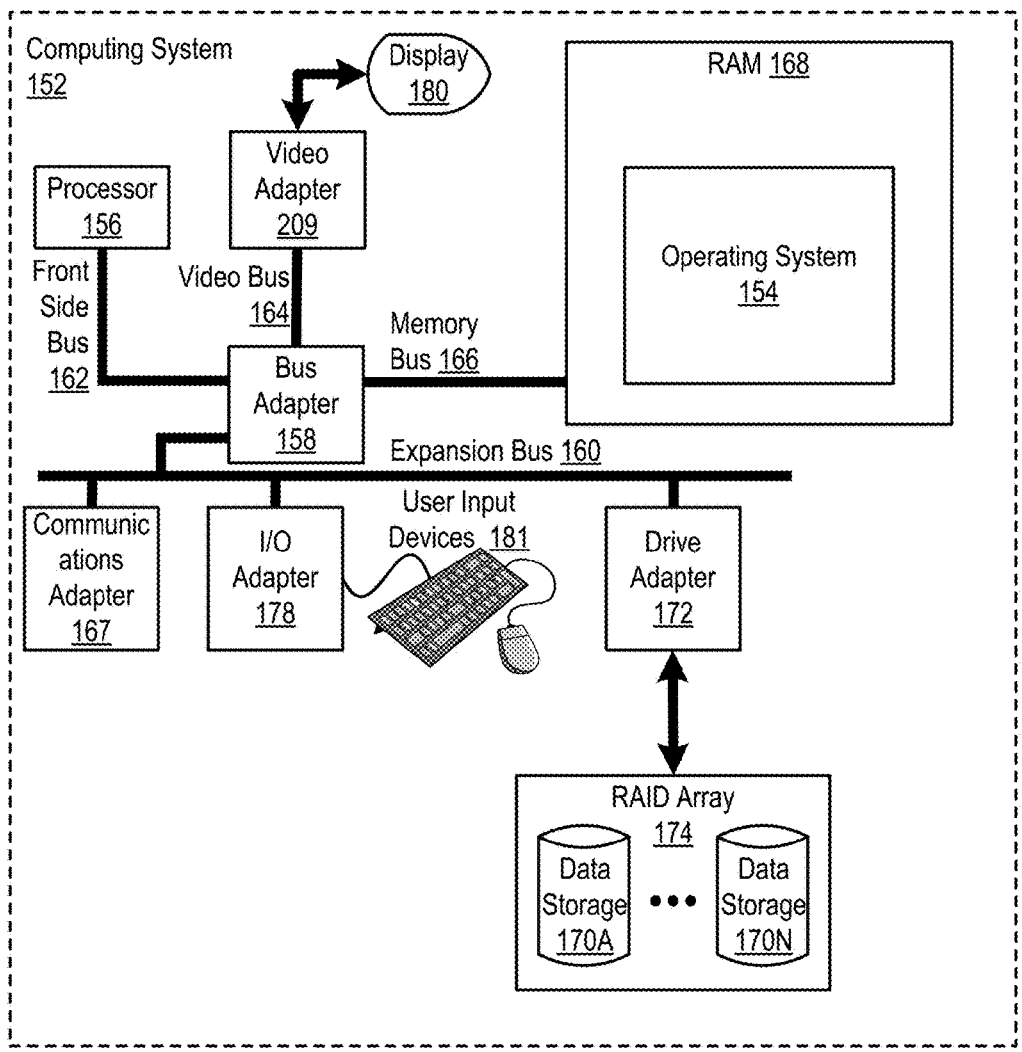
FIG. 1 sets forth a block diagram of an example system configured for operating a redundant array of independent disks (RAID) array with unequal stripes according to embodiments of the present invention.

Exemplary methods, apparatus, and products for operating a redundant array of independent disks (RAID) array with unequal stripes in accordance with the present invention are described with reference to the accompanying drawings, beginning with FIG. 1. FIG. 1 sets forth a block diagram of automated computing machinery comprising an exemplary computing system (152) configured for operating a RAID array with unequal stripes according to embodiments of the present invention. The computing system (152) of FIG. 1 includes at least one computer processor (156) or 'CPU' as well as random access memory (168) ('RAM') which is connected through a high speed memory bus (166) and bus adapter (158) to processor (156) and to other components of the computing system (152).

Stored in RAM (168) is an operating system (154). Operating systems useful in computers configured for operating a RAID array with unequal stripes according to embodiments of the present invention include UNIX™, Linux™, Microsoft XP™, AIX™, IBM's iOS™, and others as will occur to those of skill in the art. The operating system (154) in the example of FIG. 1 is shown in RAM (168), but many components of such software typically are stored in non-volatile memory also, such as, for example, on a disk drive (170).

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of a redundant array of independent disks (RAID) array (174). The RAID array (174) includes more than one disk drive (data storage (170A), data storage (170N)). Disk drive adapters useful in computers configured for operating a RAID array with unequal stripes according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for operating a RAID array with unequal stripes according to embodiments of the present invention include modems for wired dial-up communications, Ethernet (IEEE 802.3) adapters for wired data communications, and 802.11 adapters for wireless data communications.

Figure 2:
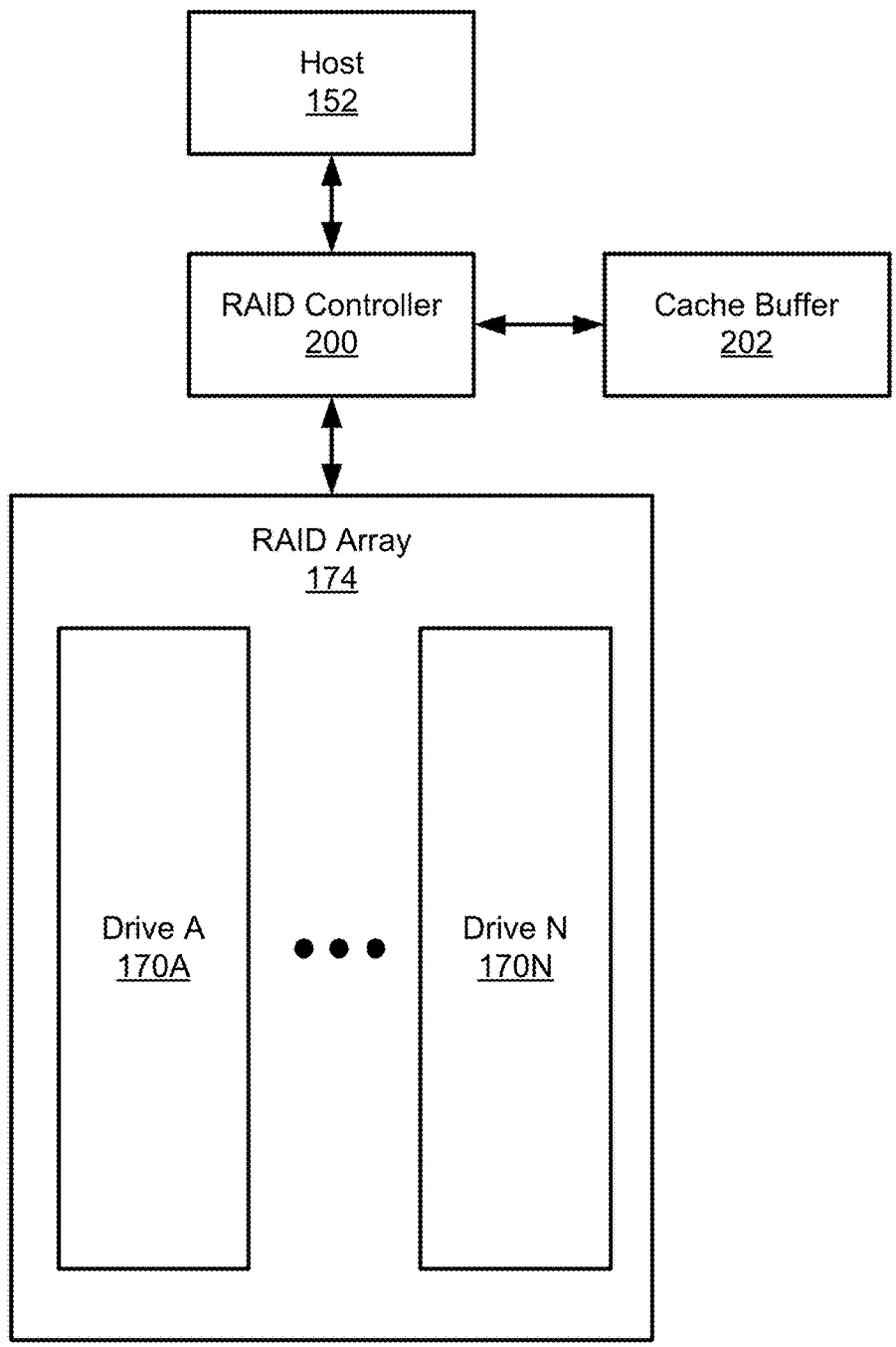
FIG. 2 sets forth a block diagram for operating a RAID array with unequal stripes according to embodiments of the present invention.

FIG. 2 is an example block diagram of a system configured for operating a RAID array with unequal stripes. FIG. 2 includes a host (152), a RAID controller (200), a cache buffer (202), and a RAID array (174). The RAID array (174) includes one or more drives (drive A (170A), drive N (170N)).

The host (152) is a computing system communicatively coupled to the RAID controller (200) that transmits read and write operations to the RAID controller (200). The host (152) may encompass the elements of the computing system (152) of FIG. 1 that communicate with the drive adapter (172).

The RAID controller (200) is an input/output adapter that connect non-volatile data storage to the host (152) in the form of a RAID array (174). The RAID controller (200) organizes the drives (drive A (170A), drive N (170N)) into a RAID array (174) and exposes storage capacity on the drives (drive A (170A), drive N (170N)) to the operating system and to application programs on the host (152). The RAID controller (200) administers read and write requests directed to the RAID array (174) as RAID I/O activity to and from the drives (drive A (170A), drive N (170N)). The RAID controller (200) may be part of a drive adapter (such as the drive adapter (172) in FIG. 1).

The cache buffer (202) is memory accessible to the RAID controller (200) for temporary storage of read and write operations and/or other data. The RAID controller (200) may receive read and write operations from the host (152) and temporarily store the operations in the cache buffer (202). The RAID controller (200) may also temporarily store data to be written to the RAID array (172) in the cache buffer (202).

The RAID array (174) includes the drives (drive A (170A), drive N (170N)), referred to as N number of drives. The RAID array and drives (drive A (170A), drive N (170N)) may be organized into any one of a number of RAID levels, such as RAID level five and RAID level six.

In RAID level five, a striped set of at least three RAID drives with distributed parity. Distributed parity requires all but one drive to be present to operate, although RAID functionality is not destroyed by a single drive failure. Upon drive failure, any subsequent reads can be calculated from the distributed parity so that the drive failure is masked from the end user.

In RAID level six, a striped set of at least four RAID drives with dual distributed parity. RAID level six provides fault tolerance from two drive failures; each array continues to operate with up to two failed drives. This makes larger RAID groups more practical, especially for high availability systems.

Data is written to the RAID array (174) in RAID stripes. Each RAID stripe includes a number of parity drives (P) and a number of data drives, which is the total number of drives (N) minus the number of parity drives (P). Data is written to RAID stripes as data stripes and parity stripes. Each data stripe and parity stripe of a RAID stripe may be equal in size (e.g., 256 kilobytes) to one another and each take up the same amount of disk space on each drive of the RAID stripe. Further, each data stripe may be written to the same logical block address of each drive in the N-P data drives.

Data received from the host (152) may be divided into chunks of a sub-stripe size in preparation for writing the data to the data stripes. Each sub-stripe size chunk of data may be smaller in size than the data stripe size and parity stripe size, and may be orders of magnitude smaller than the data stripe size and parity stripe size. For example, the sub-stripe size may be 4 kilobytes, and the data stripe size and parity stripe size may be 256 kilobytes.

Once the sub-stripe sized chunks are organized into write groups for each data drive and data stripe, the RAID controller (200) will attempt to perform a stripe write of the data. A stripe write is an operation that writes each data stripe and parity stripe of a RAID stripe to the RAID array in a single operation or contiguous group of operations. The RAID controller (200) may perform a stripe write by writing each full data stripe and each parity stripe simultaneously or near simultaneously to each drive. Provided enough write operations have been received and buffered, performing the stripe write (i.e., writing each data stripe and parity stripe in the RAID stripe at once) is more efficient than writing the data in smaller increments which may require reading data stored in each previously data stripe of the RAID stripe to calculate the parity, or generating a change mask for the existing parity stripe or stripes.

Figure 3:
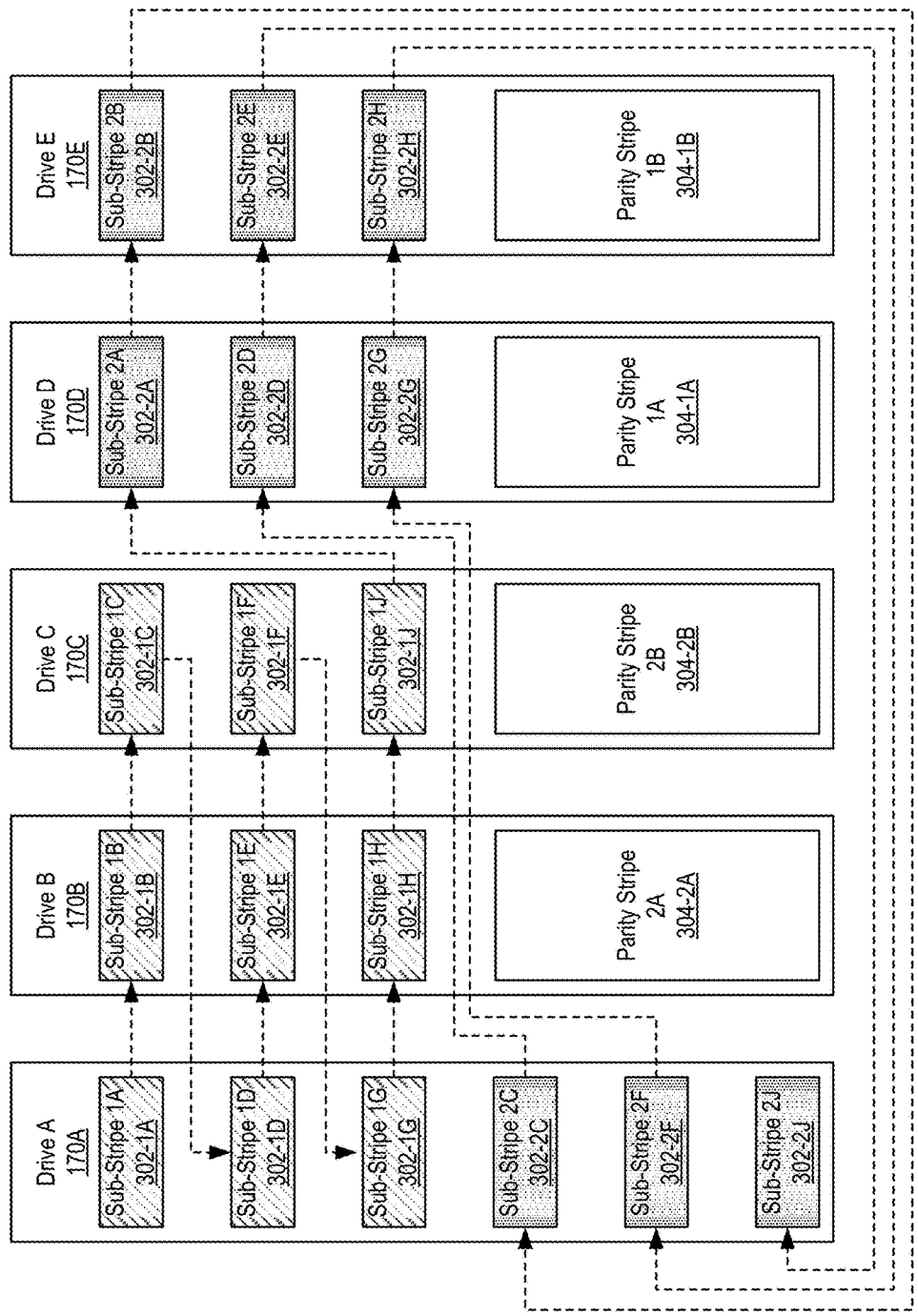
FIG. 3 sets forth a block diagram for operating a RAID array with unequal stripes according to embodiments of the present invention.

FIG. 3 is an example block diagram of a system configured for operating a RAID array with unequal stripes. FIG. 3 includes an example of two RAID stripes written to the RAID array. FIG. 3 also indicates the data order of the data received from the host and distributed among the drives.

The RAID array in FIG. 3 includes five drives (drive A (170A), drive B (170B), drive C (170C), drive D (170D), drive E (170E)). The RAID array in FIG. 3 also shows two written RAID stripes. Each RAID stripe includes two parity stripes and three data stripes, and each data stripe is shown as including three sub-stripes (i.e., three sub-stripe sized data chunks). The first RAID stripe includes sub-stripe 1A (302-1A) through sub-stripe 1J (302-1J), parity stripe 1A (304-1A), and parity stripe 1B (304-1B). The second RAID stripe includes sub-stripe 2A (302-2A) through sub-stripe 2J (302-2J), parity stripe 2A (304-2A), and parity stripe 2B (304-2B).

In the example of FIG. 3, data received from the host is distributed in write groups for each disk drive in a round-robin order. First data is added to the write group for drive A (170A) in a sub-stripe sized chunk for sub-stripe 1A (302-1A), then to the write group for drive B (170B) in a sub-stripe sized chunk for sub-stripe 1B (302-1B), then to the write group for drive C (170C) in a sub-stripe sized chunk for sub-stripe 1C (302-1C).

Subsequently, the RAID controller does not continue to distribute data to write groups for the remaining drives (drive D (170D) and drive E (170E)), which are the parity drives that will store the parity stripes for the first RAID stripe. Doing so would write the data to a second RAID stripe. Rather, the RAID controller distributes the fourth sub-stripe sized chunk to sub-stripe 1D (302-1D) on drive A (170A). Once the data has been distributed to each sub-stripe sized chunk of data for sub-stripe 1A (302-1A) through sub-stripe 1J (302-1J), a stripe write for the first RAID stripe is performed.

The stripe write operation writes a first data stripe (which includes sub-stripe 1A (302-1A), sub-stripe 1D (302-1D), and sub-stripe 1G (302-1G)) to drive A (170A), a second data stripe (which includes sub-stripe 1B (302-1B), sub-stripe 1E (302-1E), and sub-stripe 1H (302-1H)) to drive B (170B), and a third data stripe (which includes sub-stripe 1C (302-1C), sub-stripe 1F (302-1F), and sub-stripe 1J (302-1J)) to drive C (170C). The stripe write operation also calculates the parity for the first RAID stripe and writes the parity to parity stripe 1A (304-1A) and parity stripe 1B (304-1B).

Subsequent data received from the host is written to a second RAID stripe that includes sub-stripe 2A (302-2A) through sub-stripe 2J (302-2J), parity stripe 2A (304-2A), and parity stripe 2B (304-2B) in a manner similar to the above operation for the first RAID stripe.

Figure 4:
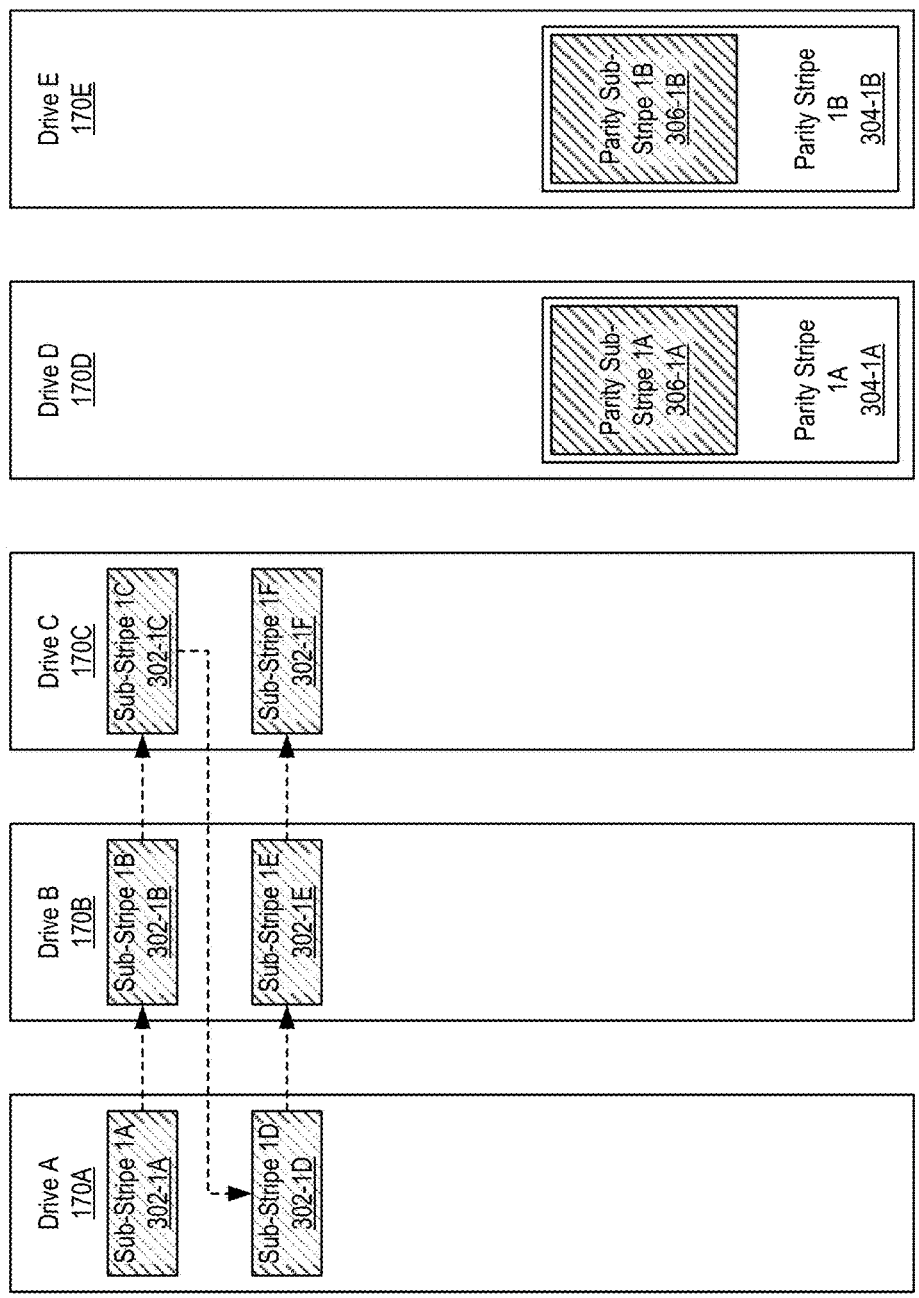
FIG. 4 sets forth a block diagram for operating a RAID array with unequal stripes according to embodiments of the present invention.

FIG. 4 is an example block diagram of a system configured for operating a RAID array with unequal stripes. FIG. 4 includes an example of data written to one RAID stripe in the RAID array. Specifically, FIG. 4 shows an example of an amount of data written to the RAID array that is less than a full RAID stripe. The data stripes and parity stripes shown in FIG. 4 are written in a stripe write operation. Specifically, sub-stripe 1A (302-1A), sub-stripe 1B (302-1B), sub-stripe 1C (302-1C), sub-stripe 1D (302-1D), sub-stripe 1E (302-1E), and sub-stripe 1F (302-1F) are written in a single operation or group of operations along with parity sub-stripe 1A (306-1A) and parity sub-stripe 1B (306-1B).

For example, assume that the data stripe size and parity stripe size is 256 kilobytes, and the data sub-stripe size is 4 kilobytes. The RAID controller may receive write operations for 24 kilobytes of data. Instead of writing all 24 kilobytes to the first data stripe on Drive A (170A), the data is assigned in 4 kilobyte sub-stripe sized chunks to each drive in a round-robin order, and the two parities are calculated from the data sub-stripes. Finally, a stripe write is performed that writes the 24 kilobytes of data to the data stripes and writes the two parities to parity sub-stripes of the parity stripes. Had the 24 kilobytes of data been assigned to a single data stripe on drive A, then a stripe write could not have been performed.

Figure 5:
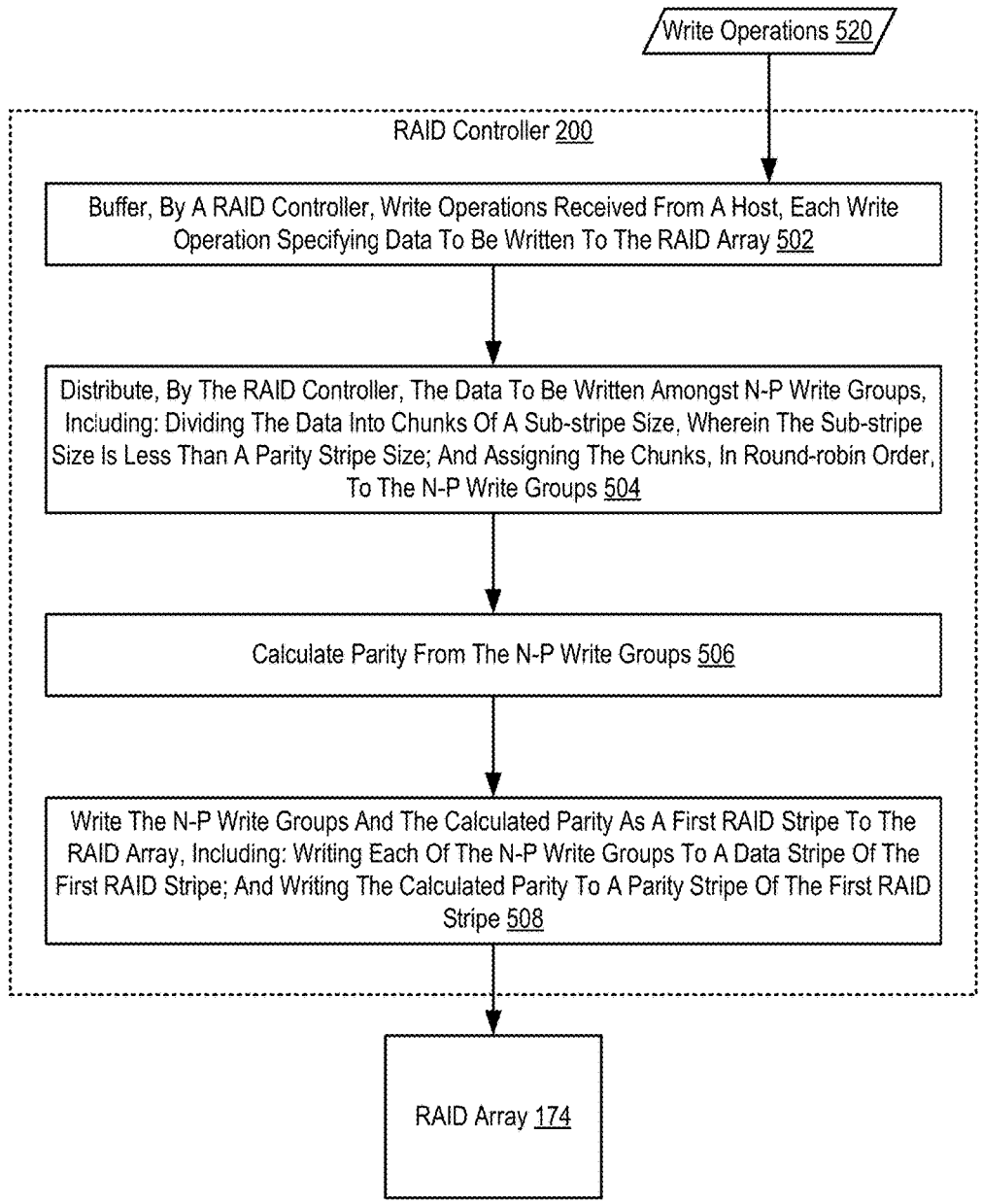
FIG. 5 sets forth a flow chart illustrating an exemplary method for operating a RAID array with unequal stripes according to embodiments of the present invention.

For further explanation, FIG. 5 sets forth a flow chart illustrating an exemplary method for operating a RAID array with unequal stripes according to embodiments of the present invention. The method of FIG. 5 includes buffering (502), by a RAID controller (200), write operations (520) received from a host, each write operation specifying data to be written to the RAID array (174), wherein the RAID array comprises N number of drives, wherein each RAID stripe includes P number of parity drives and N-P number of data drives. Buffering (502), by a RAID controller (200), write operations (520) received from a host, each write operation specifying data to be written to the RAID array (174) may be carried out by receiving write operations (520) from a host and storing the write operations (520) in the cache buffer. Each write operation may include a pointer to data and an instruction to copy the data to the RAID array. Alternatively, the write operations may include the data to be copied to the RAID array.

Buffering (502), by a RAID controller (200), write operations received from a host may also be carried out by monitoring the total amount of data specified in the received write operations. The RAID controller (200) may buffer the write operations until a threshold amount of data has been instructed to be stored in the RAID array (174) or until a threshold amount of time has passed since the write operation was received. For example, the RAID controller (200) may hold a group of write operations until a full stripe write may be performed or until the time since the oldest write operation of the group of write operations reaches a threshold time.

The method of FIG. 5 also includes distributing (504), by the RAID controller (200), the data to be written amongst N-P write groups, including: dividing the data into chunks of a sub-stripe size, wherein the sub-stripe size is less than a parity stripe size; and assigning the chunks, in round-robin order, to the N-P write groups. Dividing the data into chunks of a sub-stripe size, wherein the sub-stripe size is less than a parity stripe size and assigning the chunks, in round-robin order, to the N-P write groups may be carried out by creating a first sub-stripe sized chunk or group of sub-stripe sized chunks from the oldest-received write operation data, then creating a subsequent sub-stripe sized chunk or group of sub-stripe sized chunks from the second oldest-received write operation data, and so on. The chunks are then assigned across the N-P (i.e., non-parity) write groups.

Assigning the chunks, in round-robin order, to the N-P write groups may be carried out by assigning one chunk to each write group before assigning a second chunk to any of the write groups. Assigning the chunks, in round-robin order, to the N-P write groups may also be carried out by assigning second chunks to each write group in the same order that each write group was assigned first chunks. Each write group, therefore, includes non-consecutive sub-stripe sized chunks of the data.

Each chunk is a sub-stripe size, and the sub-stripe size is less than a parity stripe size. The parity stripe size may be the same size as a group of sub-stripe sized chunks, and may be the same size as a data stripe of the RAID stripe. For example, a sub-stripe size may be 4 kilobytes, and each data stripe and parity stripe may be 256 kilobytes.

The RAID controller (200) distributes the data to be written amongst N-P write groups based on access to information about which drives of the RAID array are data drives for the first RAID stripe and which drives of the RAID array are parity drives for the first RAID stripe. The RAID controller (200) may distribute the data first to the drives of the first RAID stripe before distributing data to another drive and, therefore, another RAID stripe. By utilizing this knowledge, the RAID controller (200) increases the frequency of buffering an amount of data for a full RAID stripe, enabling a stripe write to the RAID array.

The method of FIG. 5 also includes calculating (506) parity from the N-P write groups. Calculating (506) parity from the N-P write groups may be carried out by performing an exclusive or (XOR) operation on each of the N-P write groups. Calculating (506) parity from the N-P write groups may also be carried out using other computations, such as Reed-Solomon code, Galois field, or other suitable computations. The calculated parity may be the parity stripe size or a size that is smaller than the parity stripe size (i.e., a parity sub-stripe).

The method of FIG. 5 also includes writing (508) the N-P write groups and the calculated parity as a first RAID stripe to the RAID array (174), including: writing each of the N-P write groups to a data stripe of the first RAID stripe; and writing the calculated parity to a parity stripe of the first RAID stripe. Writing each of the N-P write groups to a data stripe of the first RAID stripe may be carried out by creating or determining an association between each write group and a drive in the RAID array and writing the data assigned to the write group to the associated drive. Multiple write groups may be written to the data stripes on each drive in a single operation.

Writing the calculated parity to a parity stripe of the first RAID stripe may be carried out by determining a location on the parity drive of the RAID stripe to write the calculated parity. The calculated parity may be written to the parity stripe on the parity drive at the same time or near the same time as the write groups are written to the data stripes on the data drives. Writing each of the N-P write groups and writing the calculated parity may be performed as a stripe write to each of the N drives.

Figure 6:
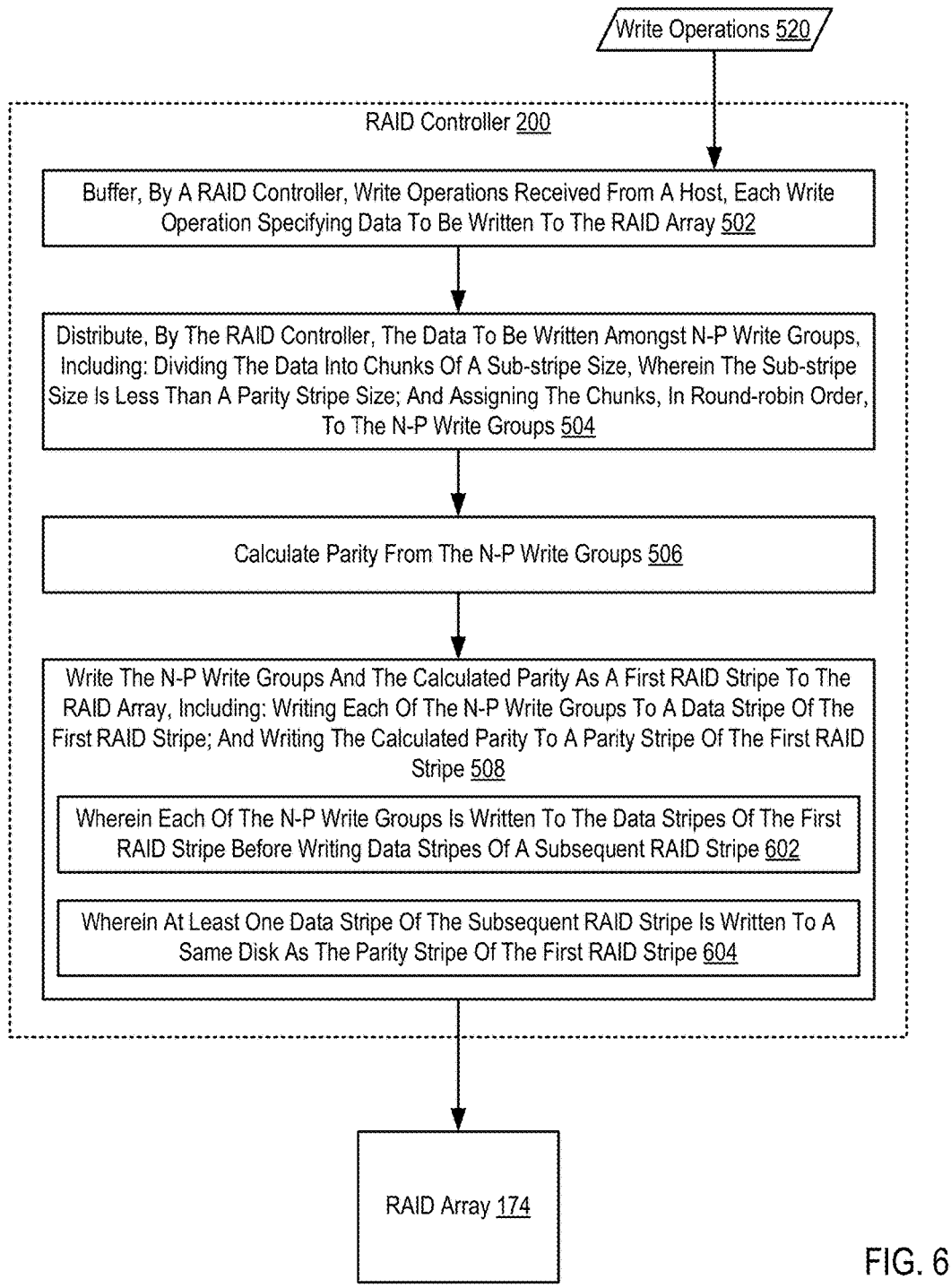
FIG. 6 sets forth a flow chart illustrating an exemplary method for operating a RAID array with unequal stripes according to embodiments of the present invention.

For further explanation, FIG. 6 sets forth a flow chart illustrating an exemplary method for operating a RAID array with unequal stripes according to embodiments of the present invention that includes buffering (502), by a RAID controller (200), write operations (520) received from a host, each write operation specifying data to be written to the RAID array (174); distributing (504), by the RAID controller (200), the data to be written amongst N-P write groups, including: dividing the data into chunks of a sub-stripe size, wherein the sub-stripe size is less than a parity stripe size; and assigning the chunks, in round-robin order, to the N-P write groups; calculating (506) parity from the N-P write groups; and writing (508) the N-P write groups and the calculated parity as a first RAID stripe to the RAID array (174), including: writing each of the N-P write groups to a data stripe of the first RAID stripe; and writing the calculated parity to a parity stripe of the first RAID stripe.

The method of FIG. 6 differs from the method of FIG. 5, however, in that writing (508) the N-P write groups and the calculated parity as a first RAID stripe to the RAID array (174) includes wherein (602) each of the N-P write groups is written to the data stripes of the first RAID stripe before writing data stripes of a subsequent RAID stripe. Writing each of the N-P write groups to the data stripes of the first RAID stripe before writing data stripes of a subsequent RAID stripe may be carried out by assigning data to each write group in sub-stripe sized chunks for the first RAID stripe before assigning data to a write group for a second or subsequent RAID stripe. In other words, the first RAID stripe is filled before a second or subsequent RAID stripe is assigned data or written.

For example, assume a RAID array (174) includes five drives set up in a RAID level six configuration, with a parity stripe and data stripe size of 256 kilobytes and sub-stripe size of 4 kilobytes. The RAID controller (200) may receive and buffer write operations that totals 800 kilobytes of data. The RAID controller (200) assigns the first 768 kilobytes in 4 kilobyte sized chunks in round-robin order to write groups for the first three drives (256 kilobytes total per drive). The RAID controller (200) then calculates a first parity and second parity (256 kilobytes each). The RAID controller (200) may then perform a stripe write that writes each write group to a data stripe on the first three drives, writes the first parity to a parity stripe on the fourth drive, and the second parity to a parity stripe on the fifth drive. The remaining 32 kilobytes are then distributed, in 4 kilobyte chunks, to the data stripes of a second RAID stripe on a different collection of the five drives, such as the fourth, fifth, and first drives.

The method of FIG. 6 also differs from the method of FIG. 5, however, in that writing (508) the N-P write groups and the calculated parity as a first RAID stripe to the RAID array (174) includes wherein (604) at least one data stripe of the subsequent RAID stripe is written to a same drive as the parity stripe of the first RAID stripe. Writing the at least one data stripe of the subsequent RAID stripe to a same drive as the parity stripe of the first RAID stripe may be carried out by determining a different combination of data drives and parity drives for the subsequent RAID stripe compared to the first RAID stripe.

For example, a RAID array may include five drives (A, B, C, D, and E). The first RAID stripe may use drives A, B, and C for data drives, and drives D and E as parity drives. The subsequent RAID stripe may use drives A, D, and E as data drives and B and C as parity drives. Once each RAID stripe is written, drive D and E will include parity stripes for the first RAID stripe and data stripes for the subsequent RAID stripe.

Figure 7:
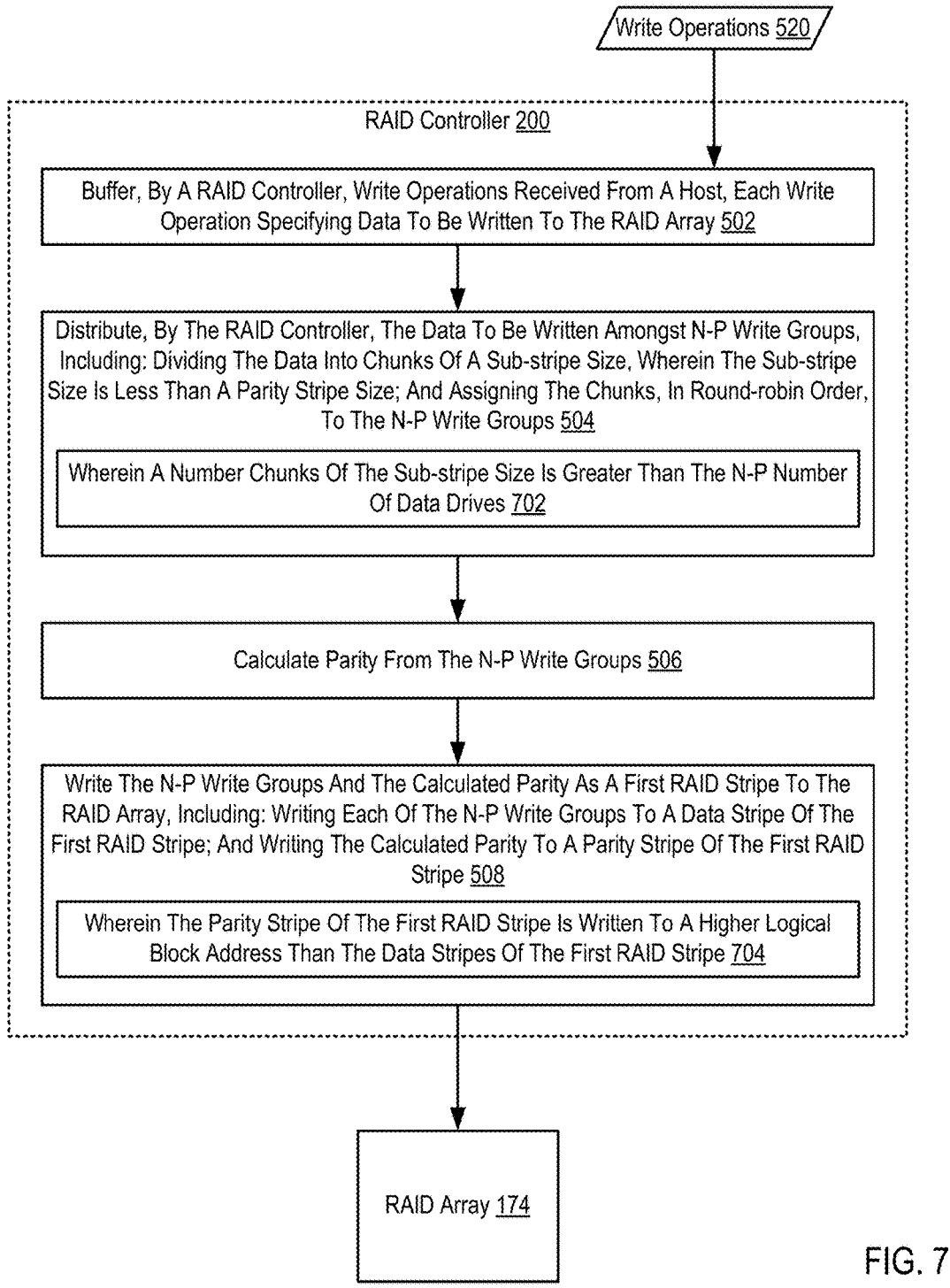
FIG. 7 sets forth a flow chart illustrating an exemplary method for operating a RAID array with unequal stripes according to embodiments of the present invention.

For further explanation, FIG. 7 sets forth a flow chart illustrating an exemplary method for operating a RAID array with unequal stripes according to embodiments of the present invention that includes buffering (502), by a RAID controller (200), write operations (520) received from a host, each write operation specifying data to be written to the RAID array (174); distributing (504), by the RAID controller (200), the data to be written amongst N-P write groups, including: dividing the data into chunks of a sub-stripe size, wherein the sub-stripe size is less than a parity stripe size; and assigning the chunks, in round-robin order, to the N-P write groups; calculating (506) parity from the N-P write groups; and writing (508) the N-P write groups and the calculated parity as a first RAID stripe to the RAID array (174), including: writing each of the N-P write groups to a data stripe of the first RAID stripe; and writing the calculated parity to a parity stripe of the first RAID stripe.

The method of FIG. 7 differs from the method of FIG. 5, however, in that distributing (504), by the RAID controller (200), the data to be written amongst N-P write groups includes wherein (702) a number chunks of the sub-stripe size is greater than the N-P number of data drives. The number of chucks of the sub-stripe size may be greater than the N-P number of data drives in that the data may be distributed into a number of chunks that exceeds the number of data stripes and data drives of the RAID stripe.

For example, a RAID array may include seven drives, and a first RAID stripe may have five data drives and two parity drives. Write operations for a full stripe write of 1280 kilobytes (5 times 256 kilobytes) may be received. The data may be divided into 320 chunks of a 4-kilobyte sub-stripe size.

The method of FIG. 7 also differs from the method of FIG. 5 in that writing (508) the N-P write groups and the calculated parity as a first RAID stripe to the RAID array (174) includes wherein (704) the parity stripe of the first RAID stripe is written to a higher logical block address than the data stripes of the first RAID stripe. Writing the parity stripe of the first RAID stripe to a higher logical block address than the data stripes of the first RAID stripe may be carried out by determining the logical block address that the data stripes have been or are to be written to, and allocating a location on the one or more parity drives with a logical block address higher than that of the data stripes, or the highest logical block address available.

Figure 8:
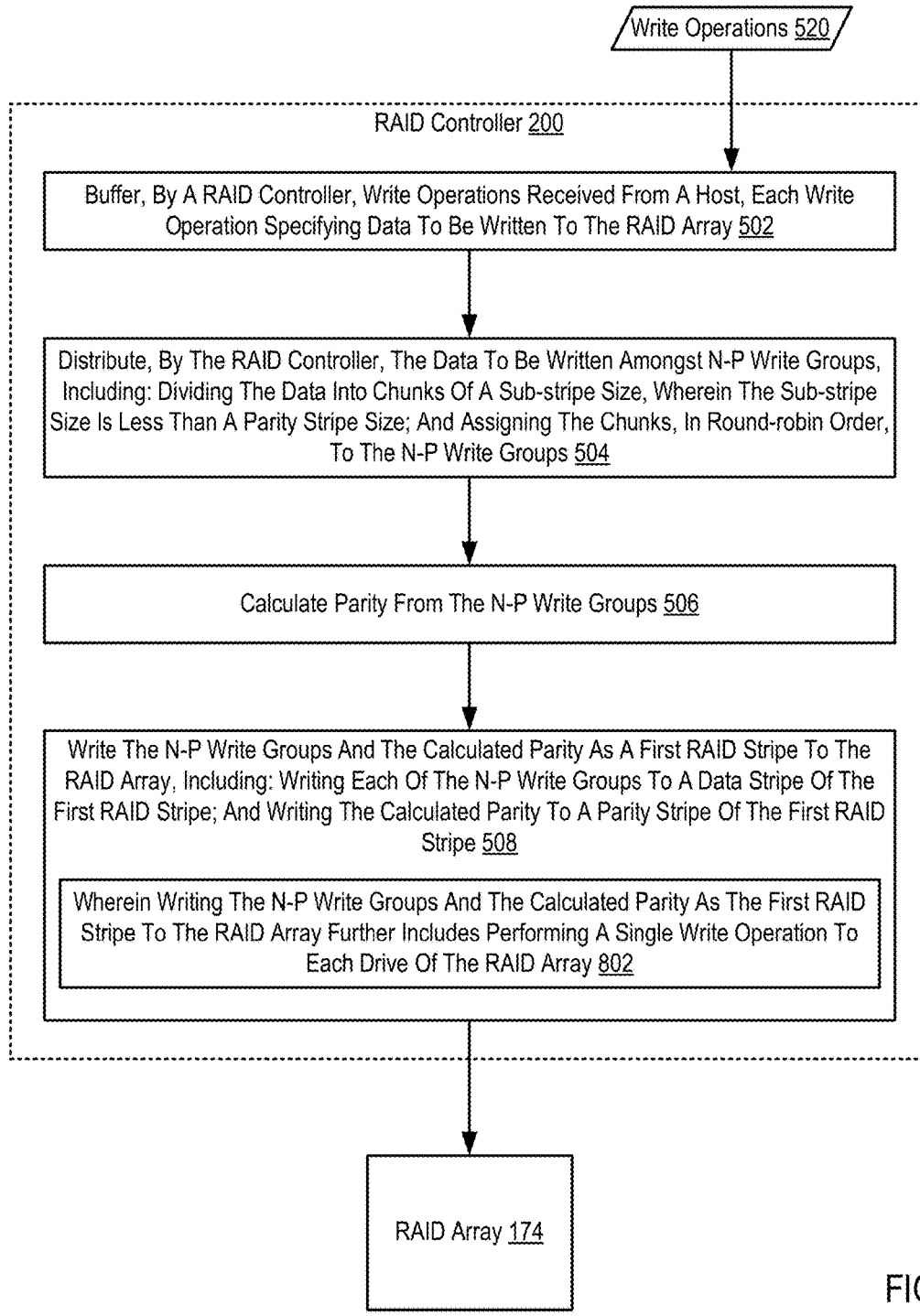
FIG. 8 sets forth a flow chart illustrating an exemplary method for operating a RAID array with unequal stripes according to embodiments of the present invention.

For further explanation, FIG. 8 sets forth a flow chart illustrating an exemplary method for operating a RAID array with unequal stripes according to embodiments of the present invention that includes buffering (502), by a RAID controller (200), write operations (520) received from a host, each write operation specifying data to be written to the RAID array (174); distributing (504), by the RAID controller (200), the data to be written amongst N-P write groups, including: dividing the data into chunks of a sub-stripe size, wherein the sub-stripe size is less than a parity stripe size; and assigning the chunks, in round-robin order, to the N-P write groups; calculating (506) parity from the N-P write groups; and writing (508) the N-P write groups and the calculated parity as a first RAID stripe to the RAID array (174), including: writing each of the N-P write groups to a data stripe of the first RAID stripe; and writing the calculated parity to a parity stripe of the first RAID stripe.

The method of FIG. 8 differs from the method of FIG. 5, however, in that writing (508) the N-P write groups and the calculated parity as a first RAID stripe to the RAID array (174) includes wherein (802) writing the N-P write groups and the calculated parity as the first RAID stripe to the RAID array further includes performing a single write operation to each drive of the RAID array. Performing a single write operation to each drive of the RAID array may be carried out by writing the first RAID stripe in a stripe write operation. The stripe write operation may include writing each data stripe and parity stripe to the RAID array simultaneously or with near simultaneous operations.

Figure 9:
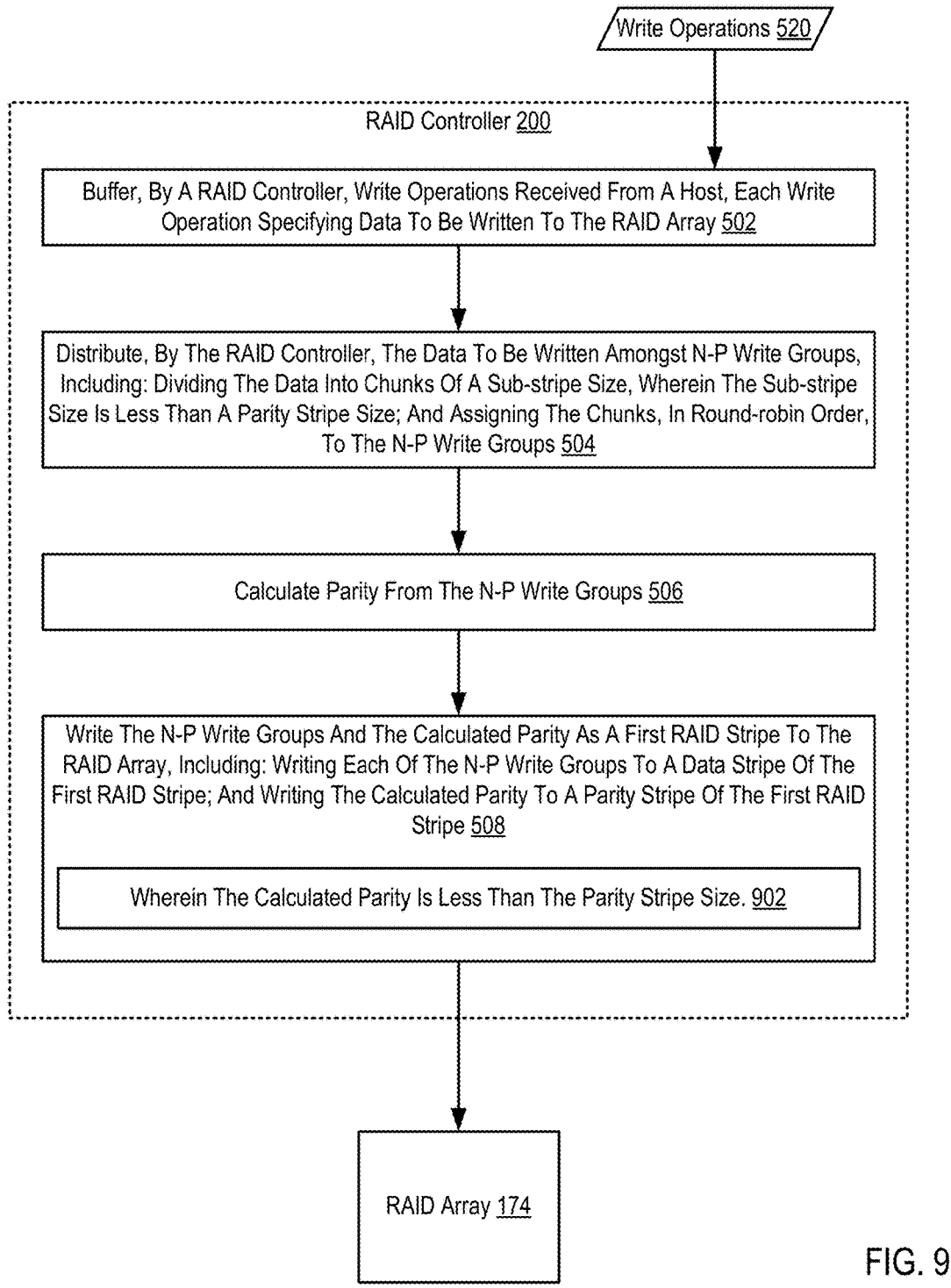
FIG. 9 sets forth a flow chart illustrating an exemplary method for operating a RAID array with unequal stripes according to embodiments of the present invention.

For further explanation, FIG. 9 sets forth a flow chart illustrating an exemplary method for operating a RAID array with unequal stripes according to embodiments of the present invention that includes buffering (502), by a RAID controller (200), write operations (520) received from a host, each write operation specifying data to be written to the RAID array (174); distributing (504), by the RAID controller (200), the data to be written amongst N-P write groups, including: dividing the data into chunks of a sub-stripe size, wherein the sub-stripe size is less than a parity stripe size; and assigning the chunks, in round-robin order, to the N-P write groups; calculating (506) parity from the N-P write groups; and writing (508) the N-P write groups and the calculated parity as a first RAID stripe to the RAID array (174), including: writing each of the N-P write groups to a data stripe of the first RAID stripe; and writing the calculated parity to a parity stripe of the first RAID stripe.

The method of FIG. 9 differs from the method of FIG. 5, however, in that writing (508) the N-P write groups and the calculated parity as a first RAID stripe to the RAID array (174) includes wherein (902) the calculated parity is less than the parity stripe size. The parity may be less than the parity stripe size if the data to be written to the RAID stripe is less than the total capacity of all data sub-stripes in the RAID stripe. The calculated parity may be the same size as the parity stripe size (and the data stripe size), or may be less than the parity stripe size. The calculated parity may be a multiple of the data sub-stripe size. A stripe write operation may include writing an amount of data to the data stripes that is a multiple of the data sub-stripe size and the same amount of calculated parity to the parity stripe.

In view of the explanations set forth above, readers will recognize that the benefits of operating a RAID array with unequal stripes according to embodiments of the present invention include:

Improving the operation of a computer system by maximizing the number of stripe writes performed on a RAID array, increasing storage access efficiency.

Improving the operation of a computer system by reducing the frequency of parity locks necessary to write data to a RAID array, increasing storage access efficiency.

Exemplary embodiments of the present invention are described largely in the context of a fully functional computer system for operating a RAID array with unequal stripes. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of operating a redundant array of independent disks (RAID) array, the RAID array comprising N number of drives to which data is written in RAID stripes, where each RAID stripe includes P number of parity drives that store parity in parity stripes and N-P number of data drives that store data in data stripes, the method comprising:
    buffering, by a RAID controller, write operations received from a host, each write operation specifying data to be written to the RAID array;
    distributing, by the RAID controller, the data to be written amongst the data drives of a first RAID stripe of the RAID array, including:
        dividing the data into chunks of a sub-stripe size, wherein the sub-stripe size is less than a parity stripe size; and
        assigning the chunks to write groups in a repeating pattern, each write group corresponding to a particular data drive of the first RAID stripe, the pattern including assigning respective first chunks to each write group in consecutive order beginning with a first data drive, assigning respective second chunks to each write group in consecutive order beginning with the first data drive, and so on such that each write group includes non-consecutive sub-stripe sized chunks of data;
    calculating parity from the write groups; and
    writing the write groups and the calculated parity as the first RAID stripe to the RAID array, including:
        writing each write group as a data stripe to a corresponding data drive of the first RAID stripe; and
        writing the calculated parity as a parity stripe to a corresponding parity drive of the first RAID stripe.

2. The method of claim 1, wherein the write groups are written to corresponding data stripes of the first RAID stripe before writing data stripes of a second RAID stripe to the RAID array.

3. The method of claim 2, wherein at least one data stripe of the second RAID stripe is written to a drive of the RAID array on which the parity stripe of the first RAID stripe resides.

4. The method of claim 1, wherein a number of chunks that are of the sub-stripe size is greater than the N-P number of data drives.

5. The method of claim 1, wherein the parity stripe of the first RAID stripe is written to a higher logical block address than the data stripes of the first RAID stripe.

6. The method of claim 1, wherein writing the write groups and the calculated parity as the first RAID stripe to the RAID array further includes performing a single write operation to each drive of the RAID array.

7. The method of claim 1, wherein the calculated parity is less than the parity stripe size.

8. An apparatus for operating a redundant array of independent disks (RAID) array, the RAID array comprising N number of drives to which data is written in RAID stripes, where each RAID stripe includes P number of parity drives that store parity in parity stripes and N-P number of data drives that store data in data stripes, the apparatus comprising a computer processor and a computer memory having disposed within it computer program instructions that, when executed by the computer processor, cause the apparatus to carry out the steps of:
  buffering, by a RAID controller, write operations received from a host, each write operation specifying data to be written to the RAID array;
  distributing, by the RAID controller, the data to be written amongst the data drives of a first RAID stripe of the RAID array, including:
    dividing the data into chunks of a sub-stripe size, wherein the sub-stripe size is less than a parity stripe size; and
    assigning the chunks to write groups in a repeating pattern, each write group corresponding to a particular data drive of the first RAID stripe, the pattern including assigning respective first chunks to each write group in consecutive order beginning with a first data drive, assigning respective second chunks to each write group in consecutive order beginning with the first data drive, and so on such that each write group includes non-consecutive sub-stripe sized chunks of data;
  calculating parity from the write groups; and
  writing the write groups and the calculated parity as the first RAID stripe to the RAID array, including:
    writing each write group as a data stripe to a corresponding data drive of the first RAID stripe; and
    writing the calculated parity as a parity stripe to a corresponding parity drive of the first RAID stripe.

9. The apparatus of claim 8, wherein the write groups are written to corresponding data stripes of the first RAID stripe before writing data stripes of a second RAID stripe to the RAID array.

10. The apparatus of claim 9, wherein at least one data stripe of the second RAID stripe is written to a drive of the RAID array on which the parity stripe of the first RAID stripe resides.

11. The apparatus of claim 8, wherein a number of chunks that are of the sub-stripe size is greater than the N-P number of data drives.

12. The apparatus of claim 8, wherein the parity stripe of the first RAID stripe is written to a higher logical block address than the data stripes of the first RAID stripe.

13. The apparatus of claim 8, wherein writing the write groups and the calculated parity as the first RAID stripe to the RAID array further includes performing a single write operation to each drive of the RAID array.

14. The apparatus of claim 8, wherein the calculated parity is less than the parity stripe size.

15. A computer program product for operating a redundant array of independent disks (RAID) array, the RAID array comprising N number of drives to which data is written in RAID stripes, where each RAID stripe includes P number of parity drives that store parity in parity stripes and N-P number of data drives that store data in data stripes, the computer program product comprising a non-transitory computer readable storage medium comprising computer readable program instructions stored thereon, the program instructions executable to cause a computer to carry out the steps of:
  buffering, by a RAID controller, write operations received from a host, each write operation specifying data to be written to the RAID array;
  distributing, by the RAID controller, the data to be written amongst the data drives of a first RAID stripe of the RAID array, including:
    dividing the data into chunks of a sub-stripe size, wherein the sub-stripe size is less than a parity stripe size; and
    assigning the chunks to write groups in a repeating pattern, each write group corresponding to a particular data drive of the first RAID stripe, the pattern including assigning respective first chunks to each write group in consecutive order beginning with a first data drive, assigning respective second chunks to each write group in consecutive order beginning with the first data drive, and so on such that each write group includes non-consecutive sub-stripe sized chunks of data;
  calculating parity from the write groups; and
  writing the write groups and the calculated parity as the first RAID stripe to the RAID array, including:
    writing each write group as a data stripe to a corresponding data drive of the first RAID stripe; and
    writing the calculated parity as a parity stripe to a corresponding parity drive of the first RAID stripe.

16. The computer program product of claim 15, wherein the write groups are written to corresponding data stripes of the first RAID stripe before writing data stripes of a second RAID stripe to the RAID array.

17. The computer program product of claim 16, wherein at least one data stripe of the second RAID stripe is written to a drive of the RAID array on which the parity stripe of the first RAID stripe resides.

18. The computer program product of claim 15, wherein a number of chunks that are of the sub-stripe size is greater than the N-P number of data drives.

19. The computer program product of claim 15, wherein the parity stripe of the first RAID stripe is written to a higher logical block address than the data stripes of the first RAID stripe.

20. The computer program product of claim 15, wherein writing the write groups and the calculated parity as the first RAID stripe to the RAID array further includes performing a single write operation to each drive of the RAID array.

* * * * *